United States Patent [19]

Stevenson

[11] Patent Number: 5,684,056
[45] Date of Patent: Nov. 4, 1997

[54] POLYISOCYANATE-BASED FOAM AND BLOWING AGENT THEREFOR

[75] Inventor: Richard Stevenson, Mesa, Ariz.

[73] Assignee: Intercool Energy Corporation, Latham, N.Y.

[21] Appl. No.: 699,984

[22] Filed: Aug. 20, 1996

[51] Int. Cl.$^6$ ...................... C08G 18/48
[52] U.S. Cl. .............. 521/114; 521/131; 521/174
[58] Field of Search ................... 521/114, 131, 521/174

[56] References Cited

U.S. PATENT DOCUMENTS

| | | |
|---|---|---|
| 4,927,863 | 5/1990 | Bartlett et al. . |
| 4,986,930 | 1/1991 | Lund et al. . |
| 5,035,833 | 7/1991 | Ogawa et al. . |
| 5,286,759 | 2/1994 | Smits et al. . |

FOREIGN PATENT DOCUMENTS

| | | |
|---|---|---|
| 0 379 268 | 7/1990 | European Pat. Off. . |
| 0 421 790 | 4/1991 | European Pat. Off. . |
| 1-136982 | 5/1989 | Japan . |
| 90/15169 | 12/1990 | WIPO . |
| 95/08602 | 3/1995 | WIPO . |

Primary Examiner—Morton Foelak
Attorney, Agent, or Firm—Helfgott & Karas, PC.

[57] ABSTRACT

A blowing agent for use in preparing a polyisocyanate-based foam which comprises a major portion of HCFC-123, a minor portion of HCFC-141b, a branched or unbranched aliphatic alkane having from 6 to 10 carbon atoms or mixtures thereof, and a polyether component which reduces cell size in the resultant polyisocyanate-based foam. The polyether component includes a mixture of polymerized, oxidized perfluorinated propene polyethers having a molecular weight distribution of from about 400 to about 1800 units. Alternatively, the polyether component can be added to the foam precursor materials separate from the blowing agent. Blowing agents and polyether additives for polyurethane-based foams are also provided.

20 Claims, No Drawings

POLYISOCYANATE-BASED FOAM AND BLOWING AGENT THEREFOR

FIELD OF THE INVENTION

This invention relates generally to foaming systems containing a blowing agent, and more particularly to the use of such a blowing agent in forming polyisocyanate or polyurethane foams with a high index, e.g., 250 or more.

BACKGROUND OF THE INVENTION

A blowing agent is a composition, usually liquid at room temperature, which enters into a chemical reaction, here the reaction of a first component, Component A, and a reactive material, Component B, to create a rigid foam. The Component A may be a polyisocyanate or toluene diisocyanate (TDI) or polymeric diphenylmethane diisocyanate (MDI), or a combination of TDI and MDI. If TDI is used, it may be an 80/20 composition comprised of the 2–6 isomer and the 2–4 isomer. Component B contains, among other ingredients, the isocyanate reactive groups needed to create a rigid or flexible foam. The enclosed bubbles that comprise the foam contain carbon dioxide and constituents of the blowing agent in varying amounts. Yet the blowing agent is unchanged in its properties as a result of the chemical reaction; the blowing agent goes into solution as a liquid and comes out of solution as a gas during the exothermic reaction. In order to constitute a blowing agent, the material must be soluble in the constituents of the foam, but not so soluble that it destroys the polymeric linkages. It must also have a high boiling point for effective bubble formation.

For many years the blowing agents that became standard as most desirable in the preparation of isocyanate-based foams, such as rigid and flexible urethane and isocyanurate foams, were what became part of the vernacular as CFC's. Most typically, a composition identified as CFC-11 ($CCl_3F$) became a standard blowing agent. However, the use of this material is now banned by international treaty on the grounds that its release into the atmosphere damages the ozone layer in the stratosphere. As a consequence, this most standard blowing agent for forming isocyanate foams is now no longer available for use.

The result of the ban on CFC's led those of skill in the art to the utilization of related compositions. A solution was sought in the area of HCFC's, which are hydrogen-containing chlorofluoroalkanes. These HCFC's, and most particularly HCFC-123 ($CHCl_2CF_3$) and HCFC-141b ($CH_2ClCHClF$) have relatively short lifetimes in the atmosphere and tend to decompose before they reach the earth's stratosphere which contains the ozone layer. However, as set forth, for example, in U.S. Pat. No. 5,286,759, the art has considered HCFC's to have disadvantages when compared with CFC's, and those alleged disadvantages have led persons of skill in the art to seek other CFC substitutes.

In U.S. Pat. No. 5,286,759, a blowing agent is disclosed which comprises a mixture of a hydrocarbon with 4 or more carbon atoms and a polyfluorocarbon component with a specific boiling point and molecular weight ratio. Exemplary of such components are polyfluorocarbon compounds, for example, perfluorocyclohexane, polyfluoroalkanes and polyfluoroethers. Finally, this patent proposes a third component, which is stated to be halocarbons, ethers, ketones, etc.

In co-pending U.S. patent application Ser. No. 08/610,743, the entire disclosure of which is incorporated herein by reference, I describe an environmentally sound blowing agent for polyisocyanate-based foams. The agent comprises a specific combination of HCFC's and a hydrocarbon such as hexane or octane. The combination of HCFC's included in my co-pending application are readily available and environmentally sound. When used in the proposed combinations, they constitute more than satisfactory blowing agents for isocyanate resins and create a good foam resistant to decomposition and flammability. However, according to the present invention, even better foams with reduced cell sizes can be achieved by modifying the blowing agent of my co-pending application with the addition of a specified perfluorinated polyether.

It is the purpose of the present invention to provide a CFC substitute that is composed of a specific combination of HCFC's, a hydrocarbon such as hexane or octane, and a specific perfluorinated polyether. The combinations that are included in the present invention are environmentally sound. When used in the proposed combinations, the present mixtures constitute improved blowing agents for isocyanate and polyurethane resins. Polyisocyanate-based foams produced with the agents of the instant invention are resistant to decomposition and flammability and have a desirable small cell size.

SUMMARY OF THE INVENTION

The present invention is based upon the discovery that when small amounts of polymerized and oxidized perfluorinated polyethers are included in particular blowing agents for polyisocyanate-based and polyurethane-based foams, a desirable reduction in cell size results, providing stronger foam with better insulating properties and dimensional stability. As the present invention is more broadly defined, it constitutes a process for preparing a polyisocyanate-based foam or polyurethane-based foam that has reduced flammability and superior cell structure without the use of CFC's by reacting a polyisocyanate with an isocyanate-reactive material, all known in the art, together with a novel blowing agent. The blowing agent preferably comprises a mixture having a major portion of what is identified by the shorthand designation, HCFC-123, a minor portion of HCFC-141b, about 1 to 30 mole percent of a hydrocarbon, and an amount of polymerized, oxidized, perfluorinated polyether effective to reduce the cell size of the resultant foam and provide better insulating properties and dimensional stability. Polyurethane-based foams having similarly improved properties are also within the scope of the present invention.

The perfluorinated polyether of the blowing agent is preferably a polymerized and oxidized perfluorinated alkene polyether having a short carbon chain length. More preferably, the perfluorinated polyether is a mixture of perfluorinated propene polyether polymers. Mixtures of such polymers, particularly those mixtures having a wide molecular weight distribution, are most preferred.

The hydrocarbon is a branched or unbranched aliphatic alkane having from six to ten carbon atoms, or mixtures thereof. Preferably, the hydrocarbon is selected from the group consisting of hexane, octane and isomers thereof. Generally, the percent of hydrocarbon used is less than 30 mole percent, e.g., 20 percent or, even more preferably, 10 percent.

Although mixtures of various HCFC's may be used, mixtures of HCFC-123 and HCFC-141b are preferred. With respect to the quantities of HCFC-123 used, another broad expression of the invention is that this compound is used in approximately 90 to 15 mole percent, and the HCFC-141b in about 75 to 5 mole percent. More specifically, the HCFC-123 is present in about 90 to 65 percent and the HCFC-141b in about 25 to 5 mole percent. The percentages of these two ingredients can vary. According to a preferred embodiment, the HCFC-123 is present in about 75 percent and the HCFC-141b in about 15 mole percent, in which instance the hydrocarbon, which preferably is n-hexane, is present in about 10 mole percent and the perfluorinated polyether component is present in an amount of up to about 1.0% by weight based on the total weight of the blowing agent.

The invention also takes the form of a polyisocyanate-based foam or polyurethane-based foam prepared in accordance with the process of the present invention. It further takes the form of a blend of the blowing agent mixture together with an isocyanate-reactive material (Component B) in water, which blend takes part in a reaction with a polyisocyanate (Component A). It is the composition of blowing agent that distinguishes these isocyanate-reactive blends from those of the prior art.

DETAILED DESCRIPTION OF THE INVENTION

The perfluorinated polyether component of the present blowing agents preferably comprises a mixture of polymers of oxidized perfluorinated propene polyethers. It is believed that such mixtures having a wide molecular weight distribution contribute significantly to the unexpected reduction in cell size and improved insulating properties and dimensional stability. A more preferred oxidized, polymerized, perfluorinated polyether composition is available as GALDEN SV80X, from Ausimont USA, Inc., Thorofare, New Jersey. It is believed that this clear oil comprises a mixture of oxidized polymers of 1,1,2,3,3,3 hexafluoropropene having molecular weights in the range of from about 400 to 1800 units. Herein, the polyether component is considered as having a wide molecular weight distribution, that is, a range of greater than 1000 MW units, and more preferably about 1400 MW units difference between the heaviest and the lightest constituents in the polyether component.

Only a small amount of the perfluorinated polyether component is necessary to be effective. Due to its high cost, a minimum amount of the component is preferably used, i.e., only enough necessary to achieve a desired result. Amounts of up to about 1% by weight based on the total weight of the blowing agent are sufficient to achieve desired results for most applications. Amounts in the range of from about 0.5% to about 1.0% by weight are preferred, with about 0.8% by weight being more preferred. When employed at such amounts, the component enables much more blowing agent to be entrapped within the foam, thus minimizing escape of the agent. The use of these amounts of agent provides a finer microstructured foam by facilitating bubble formation and causing a reduction in cell size. Better non-burning characteristics also result to the point where the foam is highly resistant to burning and smoking.

The perfluorinated polyether component may be incorporated into the blowing agent itself or added as a separate constituent to the reactive Component B. When added to Component B, it enhances the effect of the blowing agent instead of acting as part of the blowing agent. In some embodiments of the present invention it is preferred to use the perfluorinated polyether, particularly GALDEN SV80X, as an additive to the Component B. In other embodiments, it is preferred to dissolve the perfluorinated polyether in the blowing agent, for example, when the blowing agent is used as a convenient delivery system.

Since it forms an important part of the present invention, the preferred HCFC's and mixtures of HCFC's are detailed.

Preferably, two HCFC's are blended together with the hydrocarbon to form a base formulation of the present blowing agent and will be defined more specifically. HCFC-123 is dichlorotrifluoroethane, i.e., $C_2HF_3Cl_2$. HCFC-141b is dichlorofluoroethane, $(C_2H_3FCl_2)$. Although these and other HCFC's may be used independently as the HCFC component, mixtures of these two specific HCFC's are preferred. Mixtures comprising more HCFC-123 than HCFC-141b are especially preferred for many applications.

The hydrocarbon or hydrocarbon mixture employed is selected based on the desired boiling point of the resultant blowing agent mixture. Although branched or unbranched aliphatic alkanes having from six to ten carbon atoms, and mixtures thereof may be used, aliphatic saturated alkanes having from 6 to 8 carbon atoms are more preferred. Of course, hexane is a saturated alkane with 6 carbon atoms, while heptane is a saturated alkane with 7 carbon atoms and octane is a saturated alkane with 8 carbon atoms. Other branched and unbranched aliphatic alkanes having from 6 to 10 carbon atoms are also expected to provide similar results with variations in boiling point properties. In general, the use of longer chain hydrocarbons results in higher boiling points.

The two HCFC's, when used in proper proportions, together with an appropriate alkane or mixture of alkanes and the perfluorinated polyether component, require no additional component. The present blowing agent mixtures are satisfactory replacements for banned CFC's. The mixture is satisfactory in and of itself, and the compounds for use in the mixture are readily available.

As presently advised, the most preferred embodiment of the present invention for a blowing agent comprises between 30 and 40 mole percent HCFC-123, between 50 and 60 mole percent HCFC-141b, between 5 and 15 mole percent hydrocarbon consisting of hexane, heptane or octane, and up to about 1.0% by weight a mixture of oxidized, polymerized perfluorinated propene polyethers having a wide molecular weight distribution. According to an even more preferred embodiment, the blowing agent of the present invention comprises a base formulation of about 35 mole percent HCFC-123, about 55 mole percent HCFC-141b, and about 10 mole percent hydrocarbon selected from hexane, heptane, octane and mixtures thereof, and further comprises about 0.8% by weight of the perfluorinated polyether component based on the total weight of the base formulation.

Another preferred blowing agent composition comprises 75 mole percent of HCFC-123, 15 mole percent of HCFC-141b, 10 mole percent of n-hexane, and between 0.5 and 1.0% by weight of a mixture of oxidized, polymerized, perfluorinated propene polyethers having a molecular weight range of from 400 to 1800 units. However, this mixture of compounds can vary, particularly when considering the amount of flammability that is desired to be incorporated into the final product. Thus, it will be apparent that the flammability of the HCFC's is determined by the number of hydrogen atoms in the molecules. HCFC-123 contains one hydrogen atom, being doubly chlorinated and triply fluorinated. It is essentially non-flammable. On the contrary, HCFC-141b, being doubly chlorinated and only singly fluorinated, will have 3 hydrogen atoms, and thus be far more flammable than HCFC123.

While both HCFC-123 and HCFC-141b are polar molecules and thus capable of serving as a solvent, the flammability of the mixture will vary in accordance with the percentages of the compounds used. Since it is desired that the resulting foam be substantially nonflammable, the preferred composition contains a major portion of HCFC-123 and a minor portion of HCFC-141b. Thus, while in one example a blowing agent can comprise 90 to 15 percent HCFC-123 and 75 to 5 percent HCFC-141b, all percentages being mole percents, it is preferred for many applications that the quantity of HCFC-123 predominates, e.g., that the HCFC-123 be 90 to 65 percent, or more preferably, 70 to 30 mole percent. Where flammability is not an issue, the HCFC-123 can be present in about 55 to 15 mole percent and the HCFC-141b present in about 75 to 35 mole percent.

With respect to the hydrocarbon that is used, hexane, heptane and octane are preferred, although hexane is more preferred for many applications. While because of its availability, n-hexane is most preferred, isomers of hexane, heptane and octane are also satisfactory. In applications requiring higher boiling points, the use of octane is preferred over hexane and heptane. Regarding the quantity of the hydrocarbon, i.e., hexane, heptane or octane, that is utilized, in its broadest range the hydrocarbon is present in an amount of from 1–30 mole percent based on the total amount of the base formulation. However, it is preferred that the quantity of hydrocarbon be a lesser percent, e.g., no greater than 20 mole percent, and in the most preferred embodiment of the present invention, the amount of n-hexane utilized is 10 mole percent.

As those of skill in the art are aware, a blowing agent such as that disclosed herein is ordinarily mixed with the isocyanate-reactive compound, and the mixture reacted with a polyisocyanate to create the foam. Preferred reactive materials have an isocyanate-reactive hydrogen atom. Thus, polyols, which have at least two hydroxyl groups per molecule are particularly preferred due to their reactivity. It is with this reactive material that the blowing agent of the present invention is blended prior to the blend being reacted with the polyisocyanate. This preblend may also include water, surfactants and catalysts, the presence of which does not constitute part of the present invention and which are generally known in the art.

Polyurethane-based foams may also be improved according to the present invention by the incorporation therein of the perfluorinated polyether component, particularly the GALDEN SV80X component. Polyurethane-based foams also typically include first and second reactive components, water, surfactants and catalysts, all of which are generally well-known in the art.

While a prime advantage of the blowing agent is the lack of ozone depletion that exemplifies CFC's, there are other advantages. For example, the present composition has the following advantages over the prior art characterized by HCFC-141b : it goes into solution much more easily; there is a smaller loss of blowing agent during the reaction; the blowing agent stays in solution at lower temperatures (40° F.); it is much more flame resistant; it has about 20% more yield for the same amount of blowing agent; it can use less catalyst and flame retardant; it can tolerate more water; it has much less shrinkage and better adhesion to the substrate; the cell structure is finer and more uniform; it has higher compressive strength and a lower K factor at equivalent densities; and it has a tougher and smoother skin. Also, no surfactant is needed to avoid separation in solution. Further, it is non-flammable as a liquid and is EPA approved: ozone depletion potential 0.03 compared to 0.1 for HCFC-141b, and there is no delamination between passes of spray-applied foam.

It will be apparent to those of skill in the art that certain modifications and alterations can be made in this disclosure without departing from the spirit of the invention. For example, tolylenediisocyanate foams are also improved by use of the blowing agent of the present invention, and where the blowing agent is used with polystyrene foams, HCFC-142b (1-chloro-1,1-difluoroethane) can be used as a substitute for HCFC-141b. As to all such changes, it is desired that they be included within the purview of the invention which is to be limited only by the scope, including equivalents, of the following, appended claims.

What is claimed is:

1. A process for preparing a polyisocyanate-based foam that has reduced flammability and superior cell structure without the use of CFC's, by reacting a polyisocyanate with an isocyanate-reactive material, a polyether component, and a blowing agent, wherein said blowing agent comprises a base formulation of one or more hydrogen-containing chlorofluoroalkane (HCFC), and about 1 to 30 mole percent of a hydrocarbon selected from the group consisting branched and unbranched aliphatic alkanes having from 6 to 10 carbon atoms and mixtures thereof, said polyether component being present in an amount effective to reduce the cell size of a resulting polyisocyanate-based foam and comprising a mixture of polymerized, oxidized perfluorinated propene polyethers having a wide molecular weight distribution.

2. A process as claimed in claim 1, wherein said one or more HCFC comprises a mixture having a major portion of HCFC-123, and a minor portion of HCFC-141b.

3. A process as claimed in claim 1, wherein said hydrocarbon is n-hexane and is present in an amount of about 1 to 20 mole percent.

4. A process as claimed in claim 3, wherein said n-hexane is present in an amount of about 1 to 10 mole percent.

5. A process as claimed in claim 1, wherein said blowing agent comprises a base formulation of about 15 to 90 mole percent HCFC-123, about 5 to 75 mole percent HCFC-141b, and about 1 to 20 mole percent of a hydrocarbon selected from the group consisting of branched and unbranched aliphatic alkanes having from 6 to 10 carbon atoms and mixtures thereof, said polyether component being present in an amount of up to about 1% by weight based on the total weight of the base formulation and comprising a mixture of polymerized, oxidized perfluorinated propene polyethers having a molecular weight distribution of from about 400 to about 1800 units.

6. A process as claimed in claim 5, wherein said hydrocarbon comprises at least one member selected from the group consisting of hexane, heptane, octane and mixtures thereof.

7. A process as claimed in claim 5, wherein said HCFC-123 is present in an amount of about 65 to 90 mole percent and said HCFC-141b is present in an amount of about 5 to 20 mole percent.

8. A process as claimed in claim 5, wherein said HCFC-123 is present in an amount of about 30 to 70 mole percent and said HCFC-141b is present in an amount of about 20 to 60 mole percent.

9. A process as claimed in claim 5, wherein said HCFC-123 is present in an amount of about 30 to 40 mole percent and said HCFC-141b is present in an amount of about 50 to 60 mole percent.

10. A process as claimed in claim 5, wherein said HCFC-123 is present in an amount of about 35 mole percent, said HCFC-141b is present in an amount of about 55 mole percent, and said hydrocarbon is present in an amount of about 10 mole percent.

11. A process as claimed in claim 5, wherein said polyether component comprises GALDEN SV80X.

12. A process as claimed in claim 1, wherein said polyether component is incorporated into said blowing agent prior to reacting said polyisocyanate with said isocyanate-reactive material and said blowing agent.

13. A polyisocyanate-based foam prepared according to the process of claim 1.

14. A polyisocyanate-based foam prepared according to the process of claim 5.

15. A polyisocyanate-based foam prepared according to the process of claim 11.

16. A composition comprising a blend of isocyanate-reactive or polyurethane-reactive material, water, a minor amount of a blowing agent and a polyether component, wherein said blowing agent comprises a base mixture of about 80 to 99 mole percent hydrogen-containing chlorofluoroalkane (HCFC) or mixtures thereof, and about 1 to 20 mole percent of a hydrocarbon selected from the group consisting of branched and unbranched aliphatic alkanes having from 6 to 10 carbon atoms and mixtures thereof, said polyether component being present in an amount effective to reduce cell size in a resultant foam and comprising a mixture of polymerized, oxidized perfluorinated propene polyethers having a molecular weight distribution of from about 400 to about 1800 units.

17. A composition as claimed in claim 16, wherein said HCFC or mixture thereof comprises 15 to 90 mole percent HCFC-123, and about 5 to 75 mole percent HCFC-141b.

18. A composition as claimed in claim 16, wherein said HCFC or mixture thereof comprises about 65 to 90 mole percent HCFC-123, and about 5 to 25 mole percent HCFC-141b.

19. A composition as claimed in claim 15, wherein said polyether component comprises GALDEN SV80X.

20. A process for preparing a polyurethane-based foam that has reduced flammability and superior cell structure without the use of CFC's, by reacting a polyurethane with a urethane-reactive material, a polyether component, and a blowing agent, wherein said blowing agent comprises a base formulation of one or more hydrogen-containing chlorofluoroalkane (HCFC), and about 1 to 30 mole percent of a hydrocarbon selected from the group consisting branched and unbranched aliphatic alkanes having from 6 to 10 carbon atoms and mixtures thereof, said polyether component being present in an amount effective to reduce the cell size of a resulting foam and comprising a mixture of polymerized, oxidized perfluorinated propene polyethers having a wide molecular weight distribution.

* * * * *